(12) United States Patent
Yoon

(10) Patent No.: US 9,835,249 B2
(45) Date of Patent: Dec. 5, 2017

(54) CONTROL METHOD AND SYSTEM FOR SHIFTING MECHANISM OF VEHICLE

(71) Applicant: HYUNDAI MOTOR COMPANY, Seoul (KR)

(72) Inventor: Young Min Yoon, Suwon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/052,599

(22) Filed: Feb. 24, 2016

(65) Prior Publication Data

US 2017/0108118 A1   Apr. 20, 2017

(30) Foreign Application Priority Data

Oct. 20, 2015  (KR) .......................... 10-2015-0145748

(51) Int. Cl.
*G06F 19/00*   (2011.01)
*F16H 61/12*   (2010.01)
(Continued)

(52) U.S. Cl.
CPC ............. *F16H 61/12* (2013.01); *F16H 61/32* (2013.01); *F16H 2061/1208* (2013.01); *F16H 2061/1288* (2013.01); *F16H 2061/283* (2013.01)

(58) Field of Classification Search
CPC .... F16H 61/12; F16H 61/32; F16H 2061/283; F16H 2061/1208; F16H 2061/1288
See application file for complete search history.

(56) References Cited

U.S. PATENT DOCUMENTS 5,699,870 A * 12/1997 Warren ................... F16H 61/32
                                                               180/233
2005/0107214 A1   5/2005 Koenig
(Continued)

FOREIGN PATENT DOCUMENTS

JP   2003-194212 A   7/2003
JP   2011161982 A    8/2011
(Continued)

OTHER PUBLICATIONS

Korean Notice of Allowance dated Jan. 26, 2017 issued in Korean Patent Application No. 10-2015-0145748.
(Continued)

*Primary Examiner* — David J Hlavka
(74) *Attorney, Agent, or Firm* — McDermott Will & Emery LLP

(57) ABSTRACT

A control method for a shifting mechanism of a vehicle includes determining whether or not an error signal is generated by a motor unit, when it is determined that an error signal is generated, determining whether or not a shift finger of the shifting mechanism is shifted to one of the shift positions, when it is determined that the shift finger is shifted to one of the shift positions in the step of determining whether or not the shift finger of the shifting mechanism is shifted to one of the shift positions, confirming a value of an end position by moving the shift finger to the end position of the shift position that is currently selected, and correcting a value of a position of the shift finger using the value of the end position confirmed in the step of confirming the value of the end position.

7 Claims, 2 Drawing Sheets

(51) Int. Cl.
*F16H 61/32* (2006.01)
*F16H 61/28* (2006.01)

(56) References Cited

U.S. PATENT DOCUMENTS

| | | | | |
|---|---|---|---|---|
| 2005/0230216 | A1* | 10/2005 | Kouno | F16H 61/12 |
| | | | | 192/53.1 |
| 2006/0101933 | A1* | 5/2006 | Koenig | F16H 61/12 |
| | | | | 74/333 |
| 2008/0004767 | A1* | 1/2008 | Klump | F16H 61/0403 |
| | | | | 701/62 |
| 2011/0093172 | A1* | 4/2011 | Chen | F16H 61/32 |
| | | | | 701/52 |
| 2016/0332636 | A1* | 11/2016 | Lida | B60W 50/035 |

FOREIGN PATENT DOCUMENTS

| | | |
|---|---|---|
| JP | 2013079676 A | 5/2013 |
| JP | 2014163468 A | 9/2014 |
| KR | 101251503 B1 | 4/2013 |
| KR | 10-2013-0116757 A | 10/2013 |
| KR | 10-2014-0052384 A | 5/2014 |
| KR | 10-2015-0076486 A | 7/2015 |

OTHER PUBLICATIONS

Office Action issued in corresponding Korean Patent Application No. 10-2015-0145748 dated Oct. 28, 2016.

* cited by examiner

CONTROL METHOD AND SYSTEM FOR SHIFTING MECHANISM OF VEHICLE

CROSS REFERENCE TO RELATED APPLICATION

The present application claims the benefit of priority to Korean Patent Application Number 10-2015-0145748, filed on Oct. 20, 2015 with the Korean Intellectual Property Office, the entire contents of which application are incorporated herein for all purposes by this reference.

TECHNICAL FIELD

The present disclosure relates to a control method and system for a shifting mechanism of a vehicle, the control method and system being able to minimize positional errors of a shift finger occurring during the operation of the shifting mechanism.

BACKGROUND

A shifting mechanism refers to a mechanism that controls a transmission such that a shift finger is selected to be shifted to a shifting rail or is shifted to a gear in response to a motor unit being driven by a transmission control unit, whereby the clutch gear of a target gear engages with a relevant sleeve.

In the shifting mechanism, the position of the shift finger is controlled by a transmission control unit such that the shift finger can be correctly shifted to a target shift position through the actuation of a motor unit. When an error in the position of the shift finger occurs, the shift finger is not shifted to a correct position on the shift position, whereby a change of speed is not properly performed. Thus, due to defective engagement of shifting gears, shocks may occur, or the vehicle may not be properly driven.

In order to overcome these problems, it is required to correctly control the position of the shift finger. In this regard, a position sensor for measuring the position of the shift finger may be disposed on the shifting mechanism. However, this approach may not only increase the cost of the vehicle, but may also be problematic in terms of space utilization in a transmission having a complicated structure.

Thus, in order to determine a malfunction, such as an error in the value of the position of the shift finger, a Hall sensor disposed on the motor unit is used. A malfunction, such as an error in the value of the position of the shift finger, is determined based on an error signal received from the Hall sensor. However, meaningless error signals may be generated for a variety of reasons. When malfunctions are determined based on all of such error signals, an ordinary state may be diagnosed as a malfunction, which is problematic.

In order to compensate for this problem, an approach of filtering noises in error signals is used to determine a malfunctioning state when at least a preset number of error signals are counted. When error signals less than the preset number are accumulated, the shifting mechanism is determined not to be malfunctioning, but a defect in the engagement of the shifting gears may be caused when errors in the value of the position of the shift finger have accumulated.

The information disclosed in the Background of the Disclosure section is only for the enhancement of understanding of the background of the disclosure, and should not be taken as an acknowledgment or as any form of suggestion that this information forms a prior art that would already be known to a person skilled in the art.

SUMMARY OF THE DISCLOSURE

Accordingly, the present disclosure has been made keeping in mind the above problems occurring in the related art, and the present disclosure is intended to propose a control method and system for a shifting mechanism of a vehicle, the control method and system being able to minimize positional errors of a shift finger occurring during the operation of the shifting mechanism and simply and efficiently prevent the shifting mechanism from malfunctioning.

In order to achieve the above object, according to one aspect of the present disclosure, a control method for a shifting mechanism of a vehicle may include: determining whether or not an error signal is generated by a motor unit; when it is determined that an error signal is generated in the process of determining whether or not an error signal is generated by the motor unit, determining whether or not a shift finger of the shifting mechanism is shifted to one of the shift positions; when it is determined that the shift finger is shifted to one of the shift positions in the process of determining whether or not the shift finger of the shifting mechanism is shifted to one of the shift positions, confirming a value of an end position by moving the shift finger to the end position of the shift position that is currently selected; and correcting a value of a position of the shift finger using the value of the end position confirmed in the process of confirming the value of the end position.

The control method may further include, when it is determined that the shift finger is not shifted to one of the shift positions in the process of determining whether or not the shift finger of the shifting mechanism is shifted to one of the shift positions, determining whether or not the shift finger is in a neutral position.

The control method may further include, when the shift finger is determined to be in the neutral position in the process of determining whether or not the shift finger is in the neutral position, confirming the value of the end position by shifting the shift finger to one of the shift positions.

The control method may further include, when it is determined that the shift finger is in a shifting process instead of being in the neutral position in the process of determining whether or not the shift finger is in the neutral position, confirming the value of the end position when the shift finger is at the end position according to proceeding of the shifting process.

The process of correcting the value of the position of the shift finger may include correcting a difference in the position of the shift finger by correcting the value of the end position of the shift position that is currently selected based on the value of the end position confirmed in the process of confirming the value of the end position.

According to another aspect of the present disclosure, a control method for a shifting mechanism of a vehicle may includes determining, in a transmission control unit, whether or not an error signal is generated by a Hall sensor disposed on a motor unit of the shifting mechanism of the vehicle; when it is determined that an error signal is generated by the Hall sensor in the process of determining whether or not an error signal is generated by the Hall sensor, determining, in the transmission control unit, whether or not a shift finger of the shifting mechanism is shifted to one of the shift positions; when it is determined that the shift finger is shifted to one of the shift positions in the process of determining whether or not the shift finger of the shifting mechanism is shifted to one of the shift positions, confirming, in the transmission control unit, a value of an end position by moving the shift finger to the end position of the shift position that is currently selected by driving the motor unit; and correcting, in the transmission control unit, a value of a position of the shift finger using the value of the end position confirmed by the in the transmission control unit in the process of confirming the value of the end position.

According to a further aspect of the present disclosure, a control system for a shifting mechanism of a vehicle may includes a motor unit of the shifting mechanism, wherein a Hall sensor generating an error signal is disposed in the motor unit; a shift finger is moved by the motor unit of the shifting mechanism such that the shift finger is shifted to one of the shift positions; and a transmission control unit determining whether or not an error signal is generated by the Hall sensor, determining whether or not the shift finger is shifted to one of the shift positions when the error signal is generated, when the shift finger is determined as being shifted to one of the shift positions, confirming a value of an end position by moving the shift finger to the end position of the shift position that is currently selected, and correcting the value of a position of the shift finger based on the confirmed value of the end position.

The control method and system for a shifting mechanism of a vehicle can minimize positional errors of the shift finger occurring during the operation of the shifting mechanism and simply and efficiently prevent the shifting mechanism from malfunctioning.

In particular, when an error signal is generated by the Hall sensor disposed in the motor unit, an error in the position of the shift finger can be minimized by simply and efficiently confirming the end position of the shift position.

In addition, the current state of the shift finger can be determined, and the end position of the shift position can be confirmed in a simple and efficient manner based on the state of the shift finger. It is therefore possible to correct the positional error of the shift finger, thereby simply and efficiently preventing the shifting mechanism from malfunctioning.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION OF THE DISCLOSURE

Figure 1:
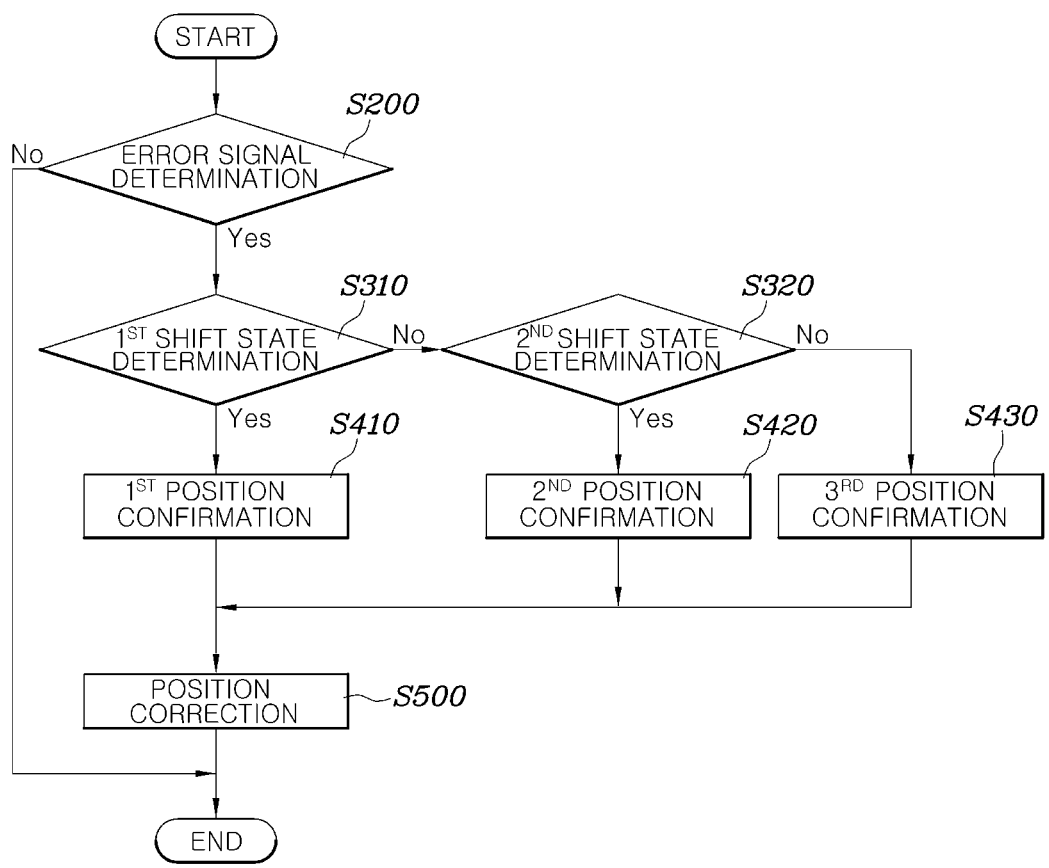
FIG. 1 is a flowchart illustrating a control method for a shifting mechanism of a vehicle according to an exemplary embodiment of the present disclosure.

Reference will now be made in greater detail to an exemplary embodiment of the present disclosure, an example of which is illustrated in the accompanying drawings. Wherever possible, the same reference numerals will be used throughout the drawings and the description to refer to the same or like parts.

Figure 2:
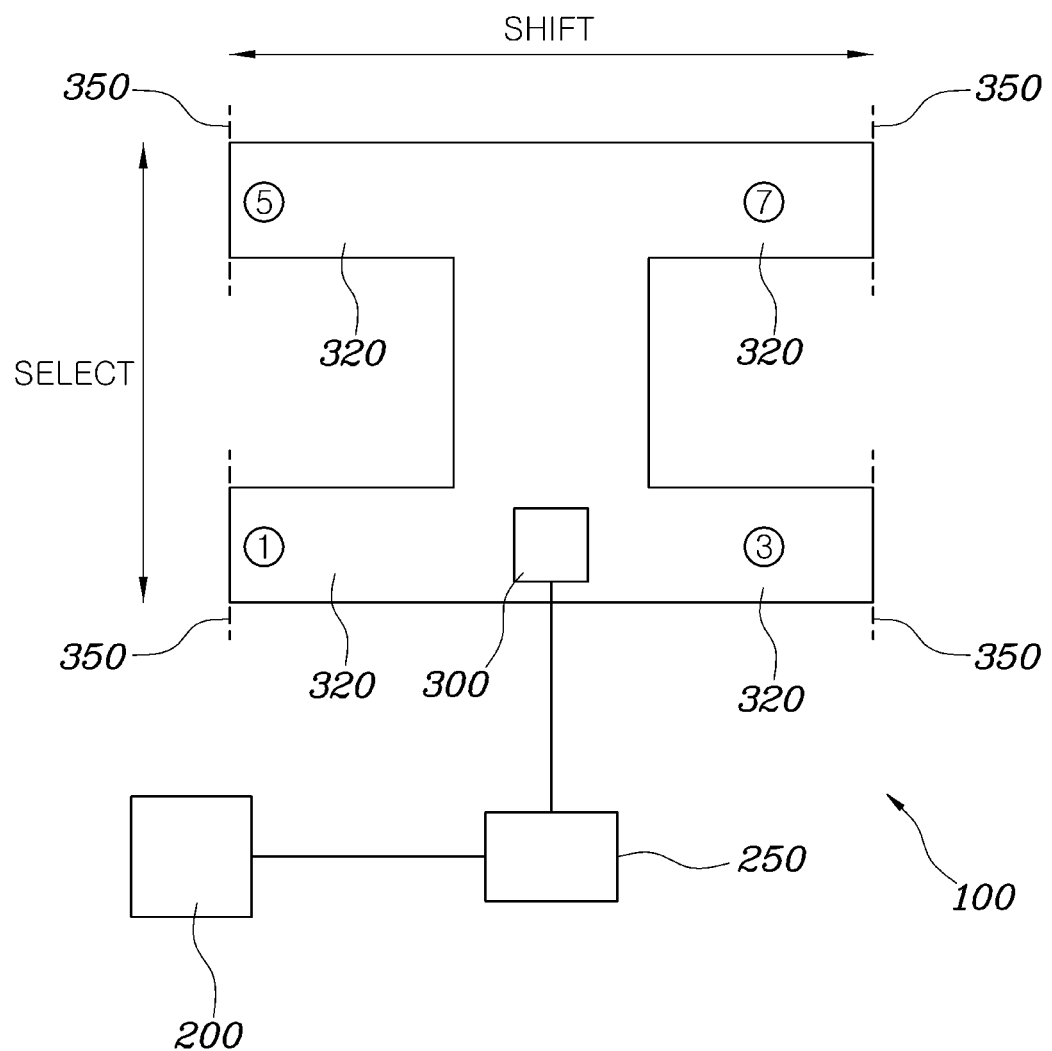
FIG. 2 is a schematic diagram illustrating a control system for a shifting mechanism of a vehicle according to an exemplary embodiment of the present disclosure.

As illustrated in FIGS. 1 and 2, a control method for a shifting mechanism of a vehicle according to an exemplary embodiment of the present disclosure may include: an error signal determination step S200 of determining whether or not an error signal is generated by a motor unit 250; a first shift state determination step S310 of determining whether or not a shift finger 300 of the shifting mechanism is shifted to one of the shift positions 320 when it is determined in the error signal determination step S200 that the error signal is generated; a first position confirmation step S410 of confirming the value of an end position 350 by moving the shift finger 300 to the end position 350 of the currently-selected shift position 320 when it is determined in the first shift state determination step S310 that the shift finger 300 is shifted to the shift position 320; and a position correction step S500 of correcting the position value of the shift finger 300 using the value of the end position 350 confirmed in the first position confirmation step S410.

Describing in more detail, the error signal determination step S200 may determine whether or not an error signal is generated by the motor unit 250 of the shifting mechanism of the vehicle.

The motor unit 250 of the shifting mechanism may have a Hall sensor for detecting the operating state of a motor. The Hall sensor may previously transmit, or have previously transmitted, a signal regarding the operating state of the motor when the motor operates, or is operated by, a transmission control unit 200. When the pattern of a signal transmitted by the Hall sensor is different from that of an ordinary signal preset in the transmission control unit 200, a signal as an error signal of the motor unit 250 may be determined.

Since the error signal indicates the possibility of abnormal operation of the motor unit 250, it is assumed that the position value of the shift finger 300 calculated by the transmission control unit 200 is different from the actual position value of the shift finger 300. Thus, the process of correcting such a difference is performed.

In the first shift state determination step S310, when it is determined in the error signal determination step S200 that the error signal is generated, it is determined whether or not the shift finger 300 of the shifting mechanism is shifted to the target shift position 320 among the shift positions 320.

When a cruising vehicle is required to change the speed, the shift finger 300 is moved to one of the shifting rails, and the shift finger 300 is shifted by a shift motor to move to one of the shift positions 320. The shift finger 300 shifted to the shift position 320 is shifted to the end position 350 of the shift position 320. Afterwards, the shift finger 300 is returned at a predetermined distance from the end position 350, and is subsequently positioned stationary at the shift position 320. This is intended to prevent the motor from having a load and the shift finger 300 from having a load, since the loads would occur when the shift finger 300 is continuously brought into close contact with the end position 350 of the shift position 320.

The shift finger 300 being shifted indicates that the shift finger 300 is moved from a single select position to one of the shift positions 320 positioned on both ends of a lateral path. The end position 350 indicates the position of each distal end of the shift positions 320 with which the shift finger 300 can be shifted into closest contact.

That is, the shift finger 300 being shifted to one of the shift positions 320 indicates that the shift finger 300 is shifted to one of the shift positions 320 to come into close contact with the relevant end position 350, returns a predetermined distance, and is positioned stationary on the shift position 320.

When it is determined in the first shift state determination step S310 that the shift finger 300 is shifted to one of the shift positions 320, the first position confirmation step S410 moves the shift finger 300 to the end position 350 of the currently-selected shift position 320, thereby confirming the value of the end position 350.

As long as a position sensor is not added, a specific position that can be a reference must be provided in order to confirm the position of the shift finger 300. The reference of the position of the shift finger 300 can be corrected by positioning the shift finger 300 to a specific position, namely, the end position 350.

The shift finger 300 is positioned at any time at the end position 350 of each of the shift positions 320 for a change of speed while the vehicle is cruising. The value of the end position 350 of each of the shift positions 320 can be a reference for correction of a positional error, since the end position 350 can be clearly specified. Thus, when an error signal is generated by the motor unit 250, the shift finger 300 is positioned at the end position 350 adjacent to one of the shift positions 320 such that the value of the position of the shift finger 300 can be obtained. In this manner, the value of the position of the shift finger 300 can be corrected.

In particular, when the shift finger 300 is stationary and shifted already to one of the shift positions 320, the end position 350 of currently-selected one of the shift positions 320 will be a reference of the position, the value of which can be rapidly determined. Consequently, the shift finger 300 shifted to one of the shift positions 320 is shifted again to the end position 350 of the same shift position 320, whereby the value of the position of the shift finger 300 can be easily and rapidly determined without any specific means.

In the position correction step S500, the value of the position of the shift finger 300 can be corrected based on the value of the end position 350 confirmed in the first position confirmation step S410.

The distances and the neutral positions of the paths along which the shift finger 300 moves and the positions of the shift positions 320 may be set previously in the transmission control unit 200. An error signal generated by the motor unit 250 may be conceived as indicating the possibility that the current position of the shift finger 300 recorded in the transmission control unit 200 differs from the actual of the shift finger 300.

Thus, the value of the position of the end position 350 is determined based on the shift finger 300 shifted to the end position 350 of the current shift position 320. Based on the value of the position, the position of the shift finger 300 recorded in the transmission control unit 200 is corrected, whereby an error in the position of the shift finger 300 can be simply and easily corrected.

As illustrated in FIGS. 1 and 2, a control method for a shifting mechanism of a vehicle according to the embodiment of the disclosure may further include a second shift state determination step S320 of determining whether or not the shift finger 300 is in a neutral position when it is determined in that first shift state determination step S310 that the shift finger 300 is not shifted to one of the shift positions 320.

Specifically, when it is determined in the first shift state determination step S310 that the shift finger 300 is shifted already and is not positioned on one of the shift positions 320, the shift finger 300 is understood to be in a neutral position or as being shifted for a change of speed.

In order to clarify the state of the shift finger 300, the transmission control unit 200 recognizes the driving state of the motor unit 250 and the position of the shift finger 300 that has been recorded up to a present time, thereby determining whether or not the shift finger 300 remains stationary in the neutral position.

As illustrated in FIGS. 1 and 2, the control method for a shifting mechanism of a vehicle according to the embodiment of the disclosure may further include a second position confirmation step S420 of confirming the value of the relevant end position 350 by shifting the shift finger 300 to one of the shift positions 320 when the shift finger 300 is determined to be in the neutral position in the step of determining whether or not the shift finger 300 is in the neutral position.

Specifically, when the shift finger 300 is determined to be in the neutral position, it may be unclear to the end position 350 of, or to, which one of the shift positions 320 the shift finger 300 will be shifted. Thus, the shift finger 300 may be shifted randomly to the end position 350 of one of the shift positions 320 on both sides of the currently-selected position.

This indicates that the shift finger 300 is shifted toward one of the shift positions 320 to confirm the value of the end position 350 regardless of the current cruising state or current shifting state of the vehicle, unlike the shift finger 300 being moved previously to one of the shift positions 320 that can be required after the current one of the shift positions to engage the gears in the relevant shift position 320.

Consequently, the value of the end position 350 may be confirmed by shifting the shift finger 300 currently remaining in the neutral position to one of the shift positions 320 in order to confirm the value of the relevant end position 350 regardless of the necessity for cruising.

As illustrated in FIGS. 1 and 2, when it is determined in the second shift state determination step S320 that the shift finger 300 is in a shifting process instead of being in the neutral position, the control method for a shifting mechanism of a vehicle according to the embodiment of the disclosure may further include a third position confirmation step S430 of confirming the value of the end position 350 when the shift finger 300 is at the end position 350 according to the proceeding of the shifting process.

Specifically, when it is determined in the second shift state determination step S320 that the shift finger 300 is not currently in the neutral position, the shift finger 300 is indicated as moving.

When the shift finger 300 is neither in the position of being completely shifted to the relevant shift position 320 nor in the neutral position, the shift finger 300 may be in the shifting process. Since the shift finger 300 is supposed to arrive at the end position 350 of one of the shift positions 320 through the shifting process, the value of the relevant end position 350 can be obtained even if a separate control process for confirming the value of the end position 350 is not required.

As illustrated in FIGS. 1 and 2, in the control method for a shifting mechanism of a vehicle according to the embodiment of the disclosure, the position correction step S500 can correct a difference in the position of the shift finger 300 by correcting the value of the end position 350 of the current shift position 320 based on the value of the end position 350 confirmed in the above position confirmation step.

Specifically, the transmission control unit 200 may shift the shift finger 300 to an intended position by driving the motor unit 250 in the state in which the distance of the shift finger 300 on the path and the value of the end position are set in order to confirm the position of the shift finger 300.

When an error signal is generated due to a malfunction of the motor unit 250, the shift finger 300 is not moved to a position set by the transmission control unit 200, such that the current position of the shift finger 300 differs from the set value of the position.

Thus, when the value of the end position 350 set in the transmission control unit 200 is corrected by newly confirming the value of the current end position 350 in relation to the position of the shift finger 300, the difference between the position set in the transmission control unit 200 and the actual position can be correctly simply and easily based on the current position of the shift finger 300.

As illustrated in FIG. 2, a control system 100 for a shifting mechanism of a vehicle according to an exemplary embodiment of the disclosure may include the motor unit 250 of the shifting mechanism, the shift finger 300, and the transmission control unit 200. The motor unit 250 may have a Hall sensor disposed therein, the Hall sensor generating an error signal. The shift finger 300 may be shifted to one of the shift positions 320 by being moved by the motor unit 250 of the shifting mechanism. The transmission control unit 200 may determine whether or not the shift finger 300 is shifted to one of the shift positions 320 when an error signal is generated; when the shift finger 300 is determined as being shifted to one of the shift positions 320, may confirm the value of the end position 350 by moving the shift finger 300 to the end position 350 of the currently-selected shift position 320; and may correct the value of the position of the shift finger 300 based on the confirmed value of the end position 350.

Describing in greater detail, the motor unit 250 of the shifting mechanism may have the Hall sensor disposed therein. The Hall sensor senses the driving states of the motor and generates signals based on the sensed driving states. Thus, the Hall sensor generates an error signal when the motor does not operate ordinarily.

The shift finger 300 is connected to the motor unit 250, and is shifted to one of the shift positions 320. When the shift finger 300 is shifted to one of the shift positions 320, the shifting gears of the relevant shift position 320 are meshed and synchronized with the output shaft.

The transmission control unit 200 is a unit controlling a transmission. The transmission control unit 200 receives a signal from the Hall sensor and, upon detecting an error signal, determines the current state of the shift finger 300.

It is preferable that the state of the shift finger 300 be divided into a shifted position, a neutral position, and a position in a shifting process. When the shift finger 300 is determined as already having been shifted to one of the shift positions 320, the transmission control unit 200 determines the value of the end position 350 of the relevant shift position 320 by shifting the shift finger 300 to the end position 350 of the relevant shift position 320 by driving the motor unit 250.

In addition, the transmission control unit 200 corrects the value of the position of the shift finger 300 by correcting a difference in the position by comparing the value of the end position 350 determined by the shifting of the shift finger 300 with the value of the end position 350 of the relevant shift position 320 currently set in the transmission control unit 200.

Although the exemplary embodiments of the present disclosure have been described for illustrative purposes, a person skilled in the art will appreciate that various modifications, additions and substitutions are possible, without departing from the scope and spirit of the present disclosure as disclosed in the accompanying claims.

What is claimed is:

1. A control method for a shifting mechanism of a vehicle, comprising:

an error signal determining step for determining whether or not an error signal is generated by a motor unit;
a first shift state determining step for determining whether or not a shift finger of the shifting mechanism is shifted to one of shift positions when the error signal is generated;
a first position confirming step for confirming a value of an end position of a shift position that is currently selected by moving the shift finger to the end position of the shift position, when the shift finger is shifted to the one of the shift positions; and
a position correcting step for correcting a value of a position of the shift finger using the value of the end position confirmed in the first position confirming step.

2. The control method according to claim 1, further comprising, a second shift state determining step for determining whether or not the shift finger is in a neutral position, when the shift finger is determined not to be shifted to the one of the shift positions in the first shift state determining step.

3. The control method according to claim 2, further comprising, a second position confirming step for confirming the value of the end position by shifting the shift finger to the one of the shift positions, when the shift finger is determined to be in the neutral position in the second shift state determining step.

4. The control method according to claim 2, further comprising, a third position confirming step for confirming the value of the end position, when the shift finger is at the end position according to a proceeding of a shifting process and when the shift finger is determined not to be in the neutral position in the second shift state determining step.

5. The control method according to claim 1, wherein the position correcting step comprises correcting a difference in the position of the shift finger by correcting the value of the end position of the shift position that is currently selected based on the value of the end position confirmed in the first position confirming step.

6. A control method for a shifting mechanism of a vehicle, comprising:

an error signal determining step for determining, in a transmission control unit, whether or not an error signal is generated by a Hall sensor disposed on a motor unit of the shifting mechanism of the vehicle;
a first shift state determining step for determining, in the transmission control unit, whether or not a shift finger of the shifting mechanism is shifted to one of shift positions when the error signal is determined to be generated by the Hall sensor in the error signal determining step;
a first position confirming step for confirming, in the transmission control unit, a value of an end position of a shift position that is currently selected by moving the shift finger to the end position of the shift position by driving the motor unit, when the shift finger is determined to be shifted to the one of the shift positions in the first shift state determining step; and
a position correcting step for correcting, in the transmission control unit, a value of a position of the shift finger using the value of the end position confirmed by the transmission control unit in the first position confirming step.

7. A control system for a shifting mechanism of a vehicle, comprising:

a motor unit of the shifting mechanism, wherein a Hall sensor generating an error signal is disposed in the motor unit;

a shift finger moved by the motor unit of the shifting mechanism such that the shift finger is shifted to one of shift positions; and a transmission control unit for (i) determining whether or not an error signal is generated by the Hall sensor, (ii) determining whether or not the shift finger is shifted to the one of the shift positions when the error signal is generated, (iii) confirming a value of an end position of a shift position that is currently selected by moving the shift finger to the end position of the shift position when the shift finger is determined as being shifted to the one of the shift positions, and (iv) correcting a value of a position of the shift finger based on the confirmed value of the end position.

* * * * *